United States Patent [19]

Matuszewski et al.

[11] Patent Number: 4,922,178
[45] Date of Patent: May 1, 1990

[54] DUAL SOURCE RECHARGEABLE BATTERY

[75] Inventors: Gerald Matuszewski, Hoffman Estates; William J. Mashek, La Grange Park, both of Ill.

[73] Assignee: Motorola, Inc., Schaumburg, Ill.

[21] Appl. No.: 91,799

[22] Filed: Aug. 31, 1987

[51] Int. Cl.$^5$ .......................... H02J 7/00; H01M 10/46
[52] U.S. Cl. .......................................... 320/2; 320/56; 455/90
[58] Field of Search .................... 320/2, 7, 56; 455/89, 455/90

[56] References Cited

U.S. PATENT DOCUMENTS

| | | | |
|---|---|---|---|
| 3,379,952 | 4/1968 | Tarrson | 320/2 |
| 3,458,794 | 7/1969 | Bohnstedt et al. | 320/2 |
| 4,160,941 | 7/1979 | Bennet | 320/56 |
| 4,214,197 | 7/1980 | Mann et al. | 320/2 |
| 4,540,929 | 9/1985 | Binkley | 320/2 |
| 4,611,161 | 9/1986 | Barker | 320/56 X |

Primary Examiner—R. J. Hickey
Attorney, Agent, or Firm—Raymond A. Jenski; Rolland R. Hackbart

[57] ABSTRACT

A rechargeable battery assembly for a hand-held radio is disclosed. The battery assembly has electrical terminals through which the battery may supply energy and be charged. Further, the battery assembly has retractable plug prongs through which the battery may be charged from a conventional 120VAC receptacle. Provision is made to prevent hazardous voltages and currents from being present at the battery electrical terminals.

19 Claims, 7 Drawing Sheets

—PRIOR ART—
FIG. 1

—PRIOR ART—

FIG. 2A

—PRIOR ART—

DUAL SOURCE RECHARGEABLE BATTERY

BACKGROUND OF THE INVENTION

This invention relates generally to rechargeable batteries and more particularly to a rechargeable battery for hand-held radio equipment which may be recharged from either a direct current (DC) power source or a high voltage alternating current (AC) power source such as the commonly available 120VAC mains. Integral means are provided to protect against electrical hazards.

Portable electronic equipment is conventionally powered by batteries. The batteries often are of the type which can be recharged by application of a suitable DC charging power over a period of time. The easiest method of such recharging is to remove the batteries from the electronic equipment, place them into a separate charging apparatus, plug the charging apparatus into a standard wall socket, and allow the charging apparatus to charge the batteries. This charging is typically accomplished by reducing the 120VAC available at the receptacle to a lower voltage, rectifying it, and controlling the current applied to the batteries. It has become commonplace for products such as flashlights to employ removable and rechargeable batteries.

Figure 1:
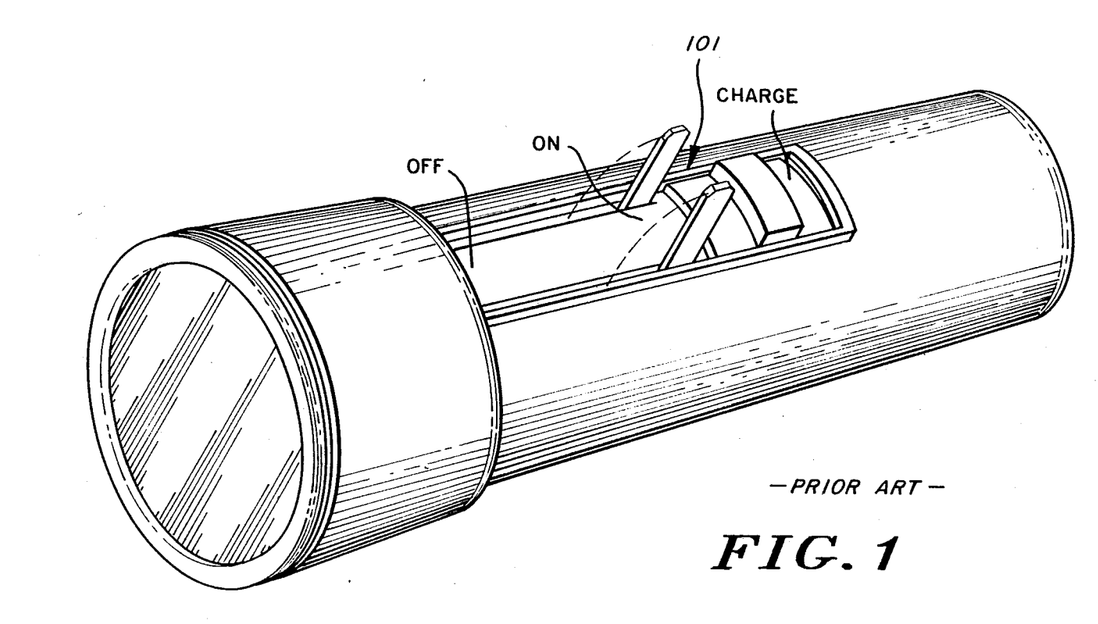
FIG. 1 is a perspective view of the Flashliter™ rechargeable flashlight offered by Black & Decker (U.S.), Inc.
Figure 2A:
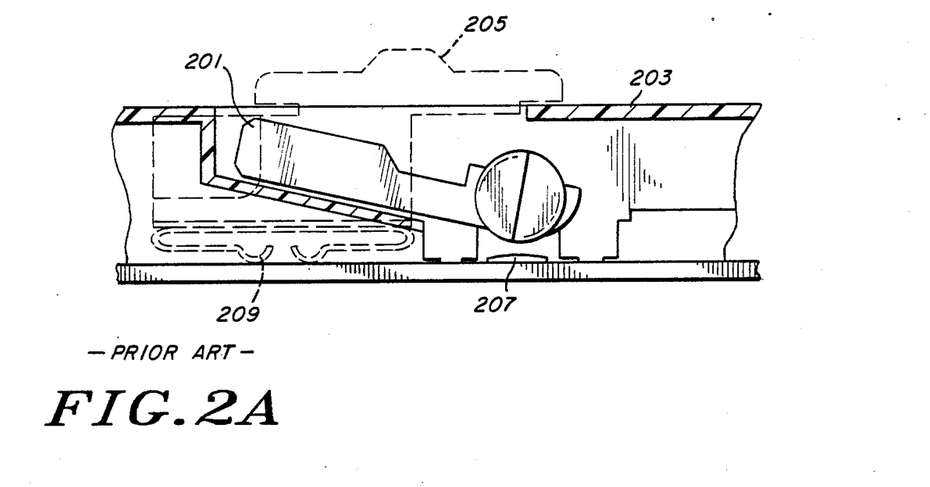
FIG. 2A is a sectional view of the plug and switch of the flashlight of FIG. 1 when the switch is in the "on" position and the plug is retracted within the housing of the flashlight.
Figure 2B:
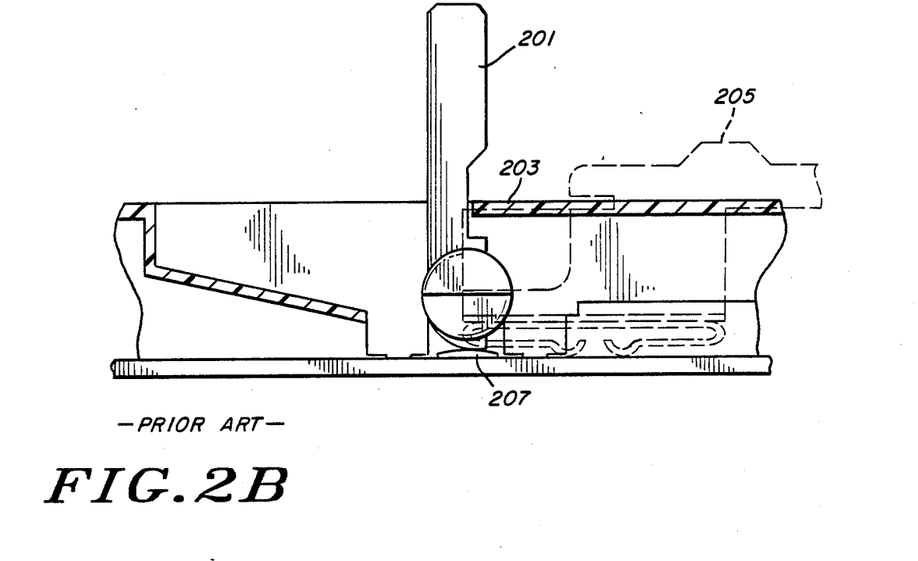
FIG. 2B is a sectional view of the plug and switch of the flashlight of FIG. 1 when the switch is in the "charge" position and the plug extends from the housing of the flashlight.

In some portable flashlights, the batteries are removable as a single package which further contains rectifying and voltage reducing circuitry as well as the dual pronged plug for plugging the battery package into the standard receptacle 120VAC mains. In other flashlights, the batteries, rectifying and voltage reducing circuitry, and plug are contained in one housing. Such a rechargeable flashlight is shown in FIG. 1 and represents a product generally available as the Flashliter™ from Black & Decker (U.S.), Inc., Shelton CT. As illustrated in FIG. 1, the plug 101 for this flashlight pivots about a point near one end of the plug prongs (201 in FIGS. 2A and 2B) so that the plug may be rotated such that the prongs 201 are positioned at or below the surface of the housing 203 of the flashlight when not in use (as shown in FIG. 2A) or extended above the surface (as shown in FIG. 2B) when the plug is to be used. The prongs 201 are rotated by a switch mechanism 205 when placed in the third of three operating positions: the "charge" position. The pivoting of the prongs 201 of the plug 101 brings the interior portions of the prongs 201 into contact with contacts 207 which are used to connect the prongs to the rectifying circuitry when the prongs are extended from the housing. When the prongs 201 are rotated into the housing, the connection to the contacts 207 is removed. The remaining two switch mechanism 205 positions, "on" and "off", place contact springs 209 (which are not related to the plug 101) in a position to complete the battery circuit to the flashlight light bulb or to disconnect the battery-light bulb circuit, respectively. In this integral flashlight, the electrical connection between the batteries and the lightbulb is inaccessible to the user and therefore does not present a hazard to the user when the batteries are being recharged.

Rechargeable batteries for portable radios, particularly two-way radio transceivers, are powerful energy storage elements which are typically enclosed in a housing having electrical contacts capable of conducting significant amounts of current for charging the batteries and for conducting electricity from the batteries to the transceiver. For convenience, the battery package may be left attached to the portable transceiver for charging or the battery may be disconnected for charging. In either instance, the portable battery is recharged from a conventional external DC charging apparatus. To be truly portable, however, a portable radio and its battery should be independent of any external charging apparatus. Thus, it is highly desirable that the battery for a portable radio be capable of being recharged without being dependent upon an external device and its associated wires and connections while maintaining a capability of being so recharged. If such a battery were rechargeable from the commonly available 120VAC power, the battery necessarily must not present a hazard to the individual attempting to recharge the battery. Thus, protection must be provided against a 120VAC shock hazard and from accidental contact with the standard DC charging contacts (which can present high discharge currents and subject the batteries to serious damage if shorted).

SUMMARY OF THE INVENTION

Therefore it is one object of the present invention to provide a rechargeable battery package which can be recharged from an external DC charger or from 120VAC mains via internal AC to DC conversion.

It is a further object of the present invention to prevent those contacts which are used to charge the battery package from an external DC charger from being a shock hazard when the battery package is being charged from the AC mains.

Accordingly, these and other objects are accomplished in the present invention which encompasses a rechargeable battery assembly for a hand-held radiotelephone. The battery assembly comprises at least one energy storage cell, apparatus for charging the energy storage cell from an external DC source, apparatus for charging the storage cell from an AC source, and apparatus for preventing the AC energy from presenting an electrical hazard via the apparatus for charging the storage cell from an external DC source.

DESCRIPTION OF THE PREFERRED EMBODIMENT

Figure 3:
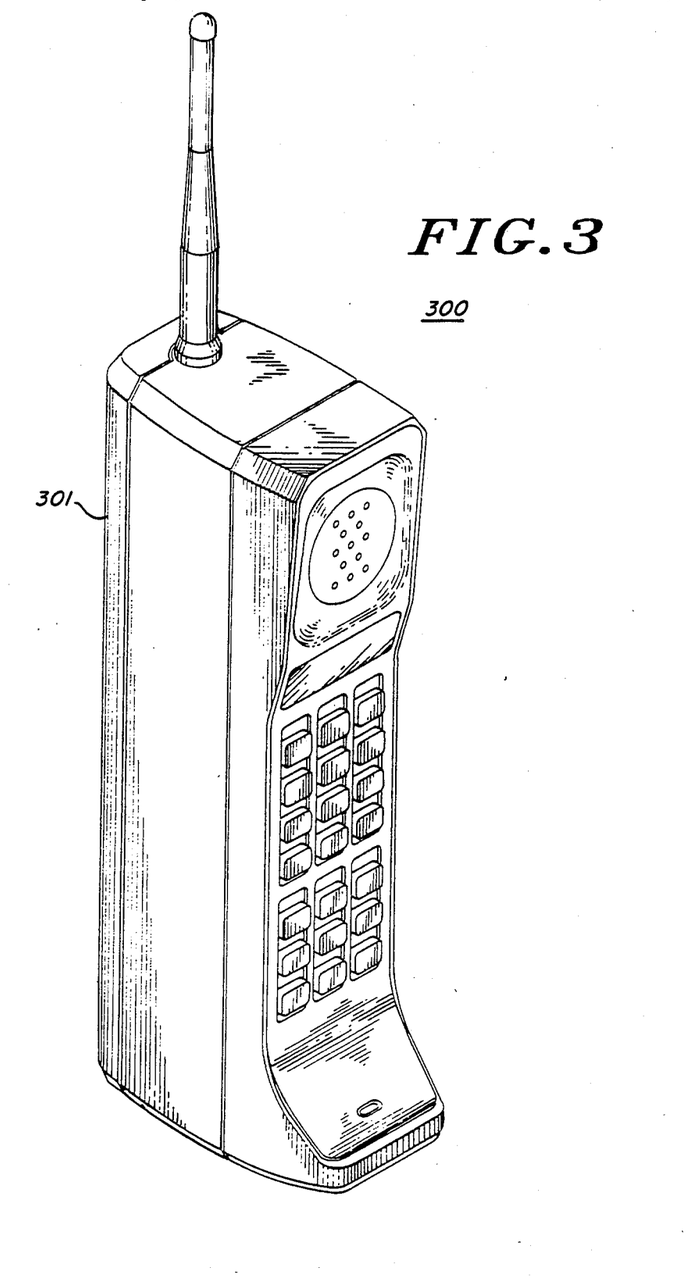
FIG. 3 is a perspective view of a portable radiotelephone for a cellular system which may employ the present invention.

A rechargeable battery such as that of the present invention may be utilized in a portable radiotelephone such as portable radiotelephone 300 shown in FIG. 3. Such a portable radiotelephone, for example Model Number F09FSD8826AN available from Motorola, Inc. or similar equipment, operates in receive and transmit modes which require substantial amount of battery power. It is expected therefore that the battery will be subjected to a significant number of charge and discharge cycles over its lifetime. In FIG. 3, a battery assembly 301 containing several battery cells and conventional protective devices is found at the rear of the portable radiotelephone. This battery assembly 301 can be conventionally charged by either placing the entire portable radiotelephone in a DC charger or the battery assembly 301 itself may be detached and placed alone in a DC charger.

Figure 4:
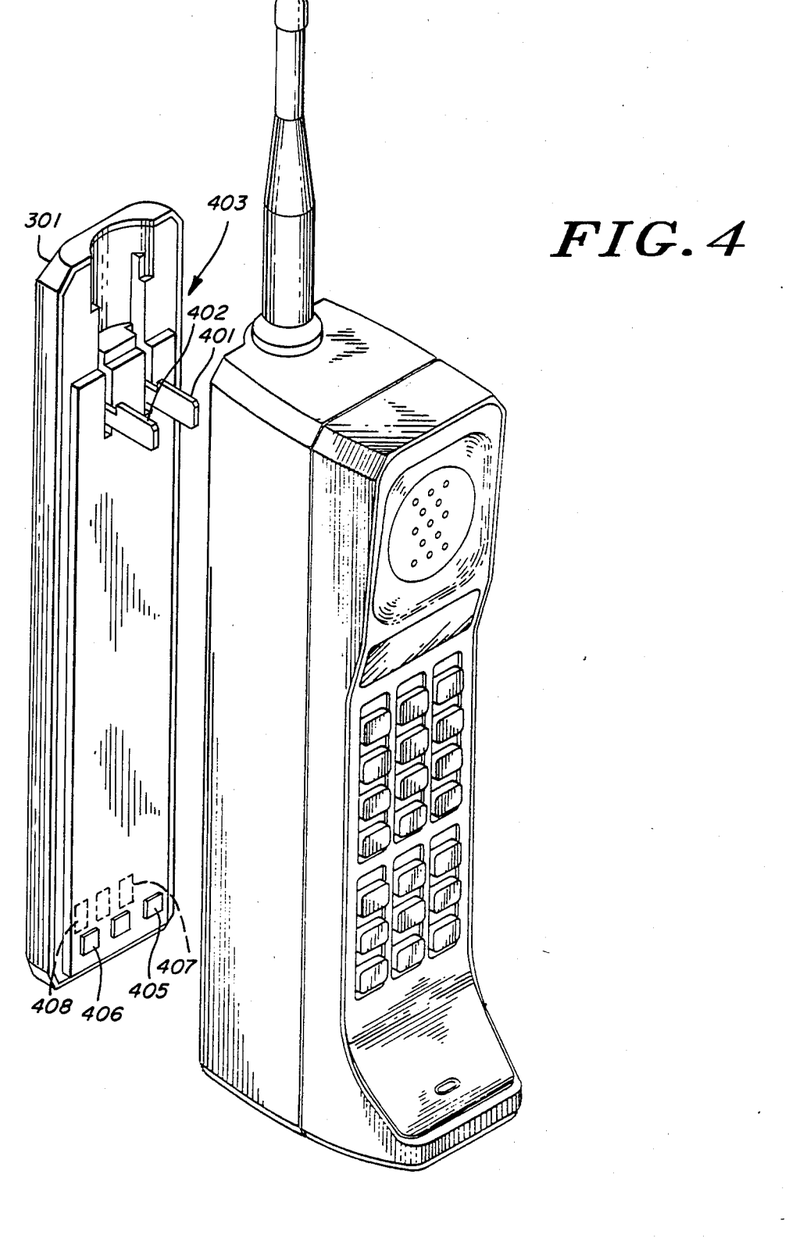
FIG. 4 is an exploded perspective view of a portable radiotelephone showing the battery assembly utilizing the present invention.

A battery assembly utilizing the present invention is shown in the exploded view of FIG. 4. Once the battery assembly 301 is detached from the portable radiotelephone, the prongs 401 and 402 of plug 403 are visible near the top of the battery assembly 301 surface which is normally in contact with the portable radiotelephone. Also visible in the detached mode are the DC supply contacts 405 and 406 which supply DC current to the portable radiotelephone. On the opposite surface of the battery assembly 301 (which is usually exposed during operation), contacts which enable the battery to be charged from a DC charger are shown as contacts 407 and 408. From the location of the battery charging contacts 407 and 408, it can be seen that this type of portable radiotelephone battery can be charged either when the battery assembly 301 is attached to the portable radiotelephone or the battery assembly 301 can be charged when it has been detached from the portable radiotelephone.

When the user wishes to charge the battery assembly utilizing the present invention from a standard wall socket, the user may rotate the prongs 401 and 402 of plug 403 into a protruding position (as shown in FIG. 4). The battery assembly can then be plugged into a standard 120VAC outlet. When charging from a wall outlet, both the battery charging contacts 405, 406 and the battery DC supply contacts 407, 408 are accessible to the user. Such accessibility, even though protected by the housing, may present a hazard to the user in that portions of the 120VAC source may be present at one or more of the contacts 405 through 408 and the total energy capacity of the batteries are potentially available to a short circuit across some of the contacts 405–408 without the safety feature of the present invention.

Figure 5A:
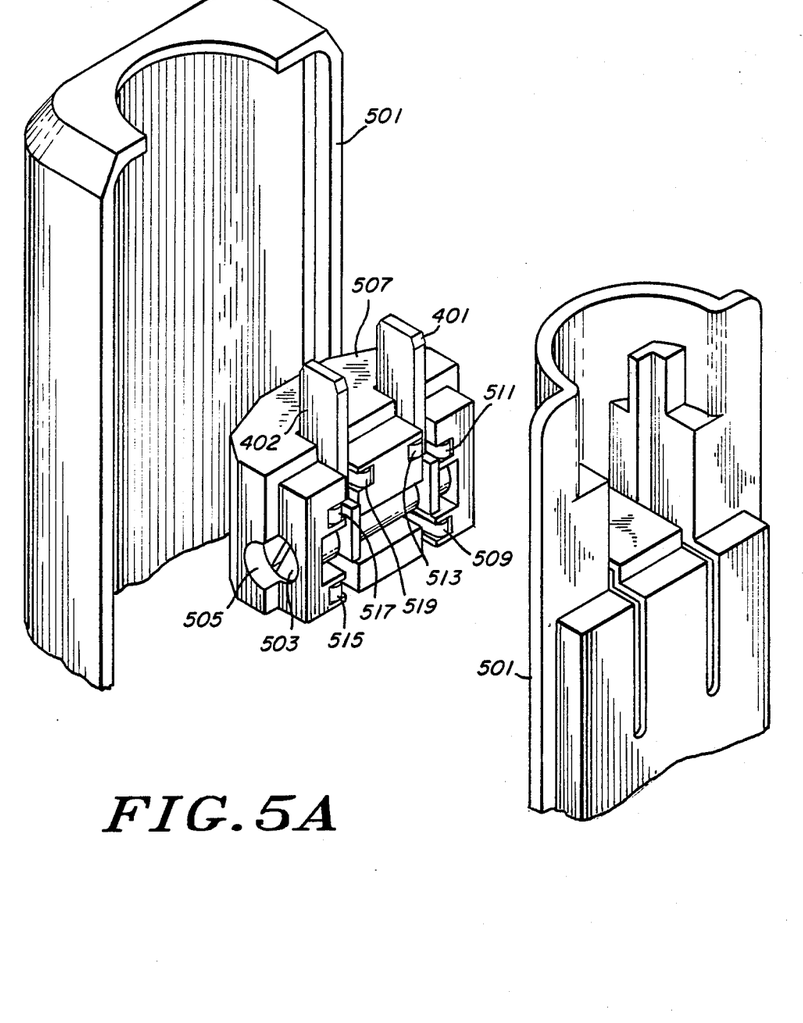
FIG. 5A is an exploded view of the plug assembly of the battery assembly of FIG. 4 showing the retracted position of the plug prongs.
Figure 5B:
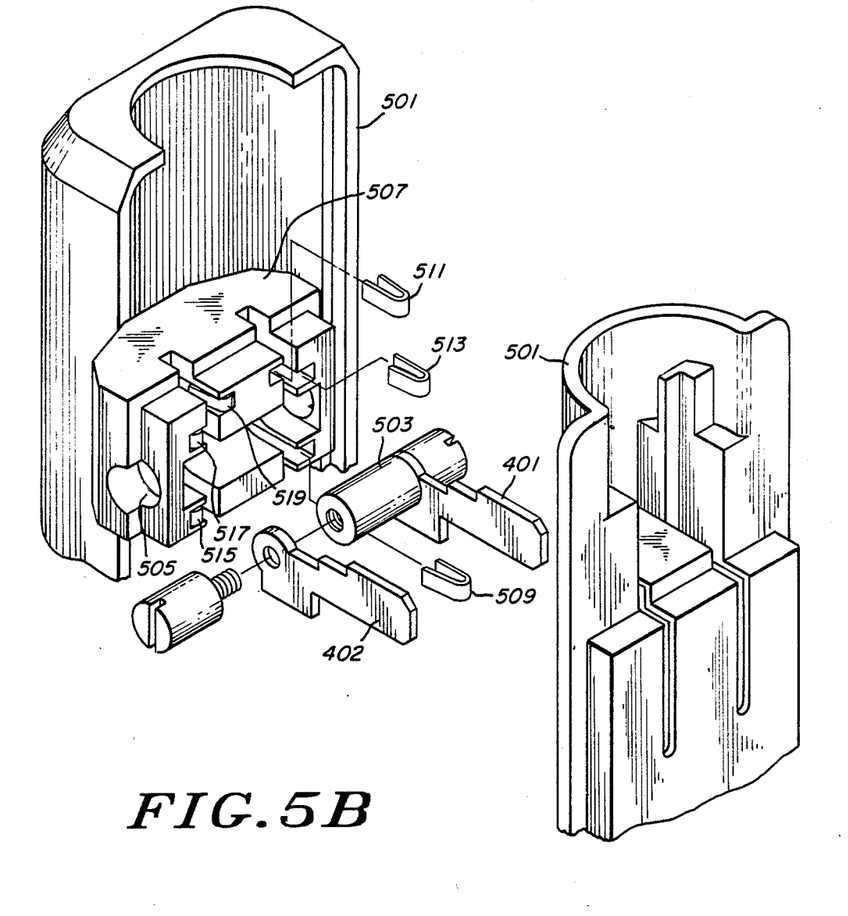
FIG. 5B is a further exploded view of the plug assembly of the battery assembly of FIG. 4 showing the extended position of the plug prongs.

An exploded view of the plug assembly is shown in FIGS. 5A and 5B. In FIG. 5A, the prongs 401 and 402 have been rotated so that they are below the surface of the housing 501 of the battery assembly 301. In the preferred embodiment of the present invention, the prongs 401 and 402 are secured to a common shaft 503 by a screw mechanism as shown or by molding the shaft 503 around the prongs 401 and 402. The shaft 503 is mounted in a bearing surface 505 of the plug assembly 507 which enables the shaft 503 and the prongs 401 and 402 to rotate 90 degrees so that in one position the prongs 401 and 402 are rotated below the surface of the battery housing 501 (FIG. 5A). In the other extreme position of shaft rotation, the prongs are perpendicular to the battery housing 501 for insertion into a standard 120VAC receptacle (FIG. 5B).

Internal to the housing of the battery, the plug assembly 507 is secured to the housing 501 by compression or other conventional securing means. The plug assembly, 507 is electrically coupled to a circuit board (not shown) which contains AC to DC converting and charging circuitry. Electrical connections are made between the prongs 401 and 402 of the plug assembly 507 and the AC/DC converter via spring electrical contacts. In the preferred embodiment of the present invention, six spring contacts are utilized within the plug assembly 507 to direct the electric current where desired and protect the portable radiotelephone user. Each of the six spring contacts (509, 511, 513, 515, 517, and 519) are shown in FIGS. 5A and 5B are placed adjacent the prongs 401 and 402 within the plug assembly 507 such that contact along the prongs 401 and 402 may be made. When the prongs are rotated into the battery housing 501, the prong 401 completes electrical continuity between spring contacts 511 and 513 while prong 402 completes electrical continuity between spring contacts 517 and 519. In this orientation, battery voltage applied to contact 513 is coupled to spring contact 511 via prong 401. Spring contact 511 is connected to external contacts 405 and 407. Likewise, an opposite polarity battery voltage is applied to spring contact 519 and coupled to spring contact 517 via prong 402. Spring contact 517 is then coupled to the opposite polarity external contacts 405 and 408. Thus, battery current may flow between the internal battery cells and the external contacts 405–406 and 407–408. Preferably, no electrical connection is made between either of the prongs 401, 402 and spring contacts 509 and 515 when the prongs are in the retracted position of FIG. 5A.

When the prongs are rotated to a position 90 degrees from the position of FIG. 5A, electrical contact is made between prong 401 and spring contact 509. Further, the electrical coupling between spring contact 513 and spring contact 511 via prong 401 is broken. Since spring contact 509 is coupled to the AC to DC charging circuitry via copper traces on a circuit board 120VAC power from a wall outlet may be connected to the charging circuitry via the connection between prong 401 and contact 509. Likewise, the DC continuity between spring contact 519 and spring contact 517 via prong 402 is interrupted and connection to prong 515 is made with prong 402 when prongs 401 and 402 are rotated to the position shown in FIG. 5B. It is important to note that when the prongs 401, 402 are in the position shown in FIG. 5B to enable charging from the 120VAC receptacle, all connection to the DC contacts 405 through 408 is broken. Thus, the possibility of the user coming in contact with hazardous voltages is virtually eliminated.

Figure 6:
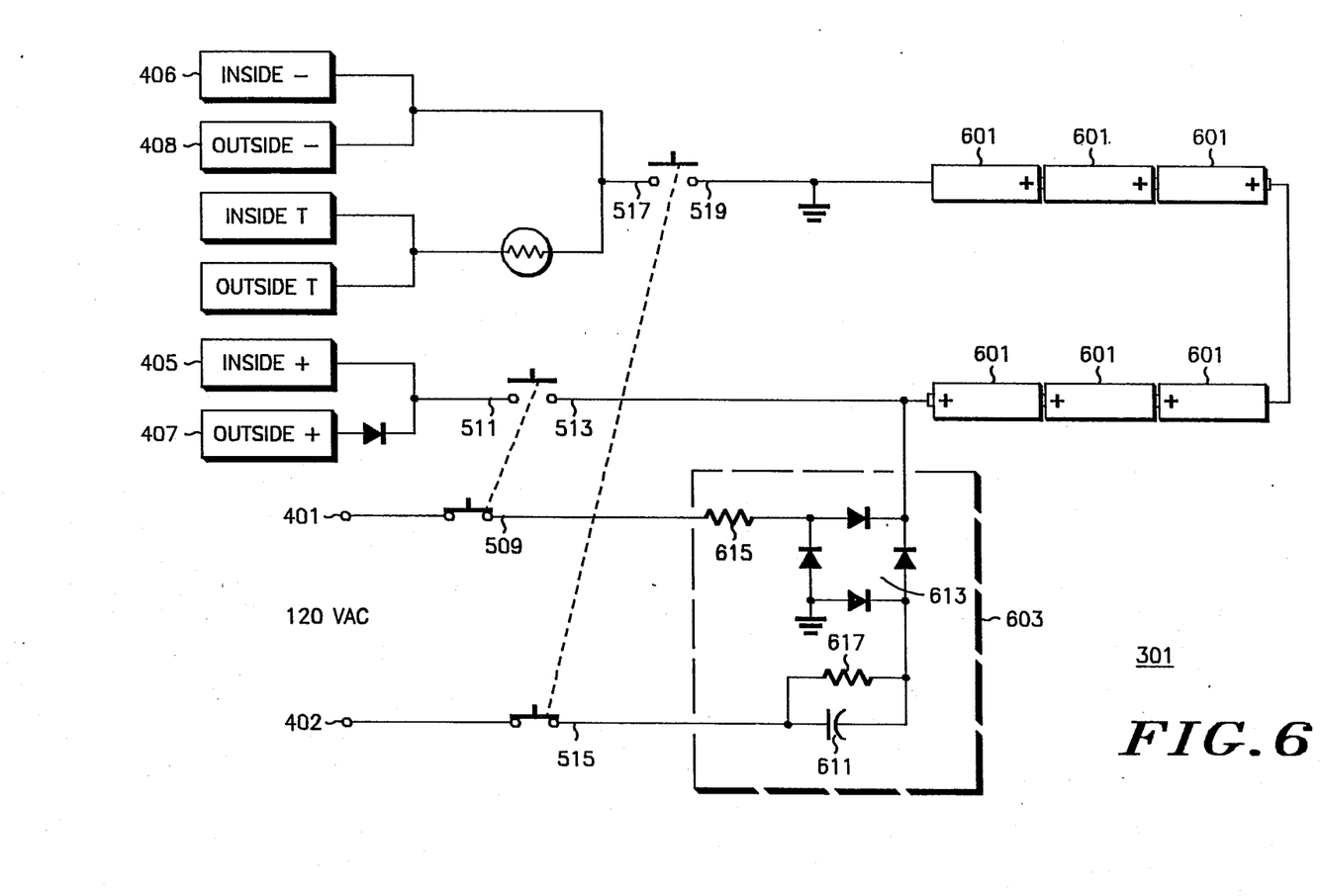
FIG. 6 is a schematic diagram of the battery assembly of FIG. 4 showing the present invention.

A schematic of the battery assembly 301 is shown in FIG. 6. A plurality of battery cells 601, which may be standard rechargeable nickel cadmium rechargeable cells, are series coupled to provide a standard operating voltage for the portable radiotelephone. The battery cells 601 are coupled to DC contacts 405 and 406 on the inside surface of the battery housing 301 to supply DC to the portable and coupled to contacts 407 and 408 on the outside surface of the portable to allow charging of the battery cells 601. The prongs 401 and 402 may be coupled to 120VAC, as indicated, and are thereafter coupled to a charging circuit 603 which converts the 120VAC to a low voltage DC at a current suitable for proper charging of the battery cells 601. The prongs 401 and 402 are illustrated in the charging mode such that 120VAC energy is connected to the charging circuitry 603 and the spring contacts 511, 513 and 517, 519 are disconnected from the DC contacts 405, 407 and 406, 409.

The charging circuitry 603 uses the reactive impedance of capacitor 611 to limit the charging current available to the full wave bridge rectifier 613. The bridge rectifier 613 converts the alternating current of the 120VAC supply to a direct current and supplies current to the battery cells 601 over a very small portion of the alternating current waveform. A low value resistor 615 limits the initial surge current charging capacitor 611 to a finite value and large value resistor 617 bleeds the charge from capacitor 611 when the circuit is deactivated. Other AC/DC charging circuits, such as those using a Zener diode may also be employed as charging circuit 603.

In summary, then, a dual source rechargeable battery assembly for a portable radiotelephone which has protection against electrical hazards has been shown and described. The battery assembly has conventional electrical terminals through which the battery may supply current to the portable and receive charging current from an external battery charger. The battery assembly has an additional plug assembly and internal charger circuitry arranged such that the plug may be rotated into one position which places the prongs of the plug beneath the surface of the battery assembly housing and a second position which places the plug prongs perpendicular to the housing. When in the first position, the plug prongs contact spring contacts within the battery assembly housing to complete the circuit between the battery cells and the DC electrical terminals thereby enabling the battery to supply current and be charged. When in the second position, the plug prongs connect to another set of spring contacts which allow 120VAC energy to be supplied to the internal charging circuitry. The connection between the DC electrical terminals and the battery cells is broken when the prongs are in the second position and the connection between the prongs and the internal battery charging circuitry is broken when the prongs are in the first position. Thus, hazardous voltages and currents are not present at the DC charging and supply terminals when the battery assembly is being charged from a 120VAC source. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. A rechargeable battery assembly for a handheld radio, comprising:
    at least one electrochemical energy storage cell;
    first means, including a first connector, for charging said storage cell from an external direct current (DC) source;
    second means, including an AC to DC converter and at least one moveable conductive prong as a second connector used to connect to an alternating current (AC) source, for charging said storage cell from said (AC) source, said at least one moveable conductive prong having first and second positions, said first position enabling said at least one moveable conductive prong to mate with an AC source receptacle whereby power from said AC source may be coupled to said AC to DC converter; and
    third means, responsive to use of said second connector and switchably coupled to said first means and switchably coupled to said second means, for interrupting said coupling between said AC source and said AC to DC converter when said moveable conductive prong is in said second position thereby preventing said AC source at said second means from presenting an electrical hazard at said first means.

2. A rechargeable battery assembly in accordance with claim 1 further comprising a housing enclosing at least said electrochemical energy storage cell and wherein said first connector further comprises an electrical contact disposed on an outside surface of said battery housing and coupled to said at least one electrochemical energy storage cell.

3. A rechargeable battery assembly in accordance with claim 2 wherein said third means further comprises switch means for interrupting said coupling between said electrical contact and said electrochemical energy storage cell when said second means is charging said at least one electromechanical storage cell.

4. A rechargeable battery assembly in accordance with claim 1 further comprising a housing for enclosing said at least one electrochemical energy storage cell, said housing having a surface configured to mate with the hand-held radio and contacts to couple said at least one electrochemical energy storage cell to the handheld radio.

5. A rechargeable battery assembly in accordance with claim 4 wherein said second position of said at least one moveable conductive prong places said moveable conductive prong below said housing surface and said first position of said at least one moveable conductive prong places at least part of said moveable conductive prong above said housing surface.

6. A dual source rechargeable battery assembly for a portable cellular radiotelephone having electrical hazard protection, comprising:
    at least one electrochemical energy storage cell;
    a housing having and outer surface and enclosing said at least one storage cell;
    a first electrical contact disposed on the outer surface of said housing and coupled to said at least one storage cell whereby charging of said electrochemical energy storage cell by a direct current (DC) source may occur;
    a second electrical contact disposed on the outer surface of said housing and coupled to said electrochemical energy storage cell whereby electrical energy may be removed from said electrochemical energy storage cell;
    an alternating current (AC) to DC converter whereby charging of said electrochemical energy storage cell by an AC source may occur;
    a moveable conductive prong having a first position and a second position, adapted to mate with an AC source receptacle in said first position, whereby said AC source may be coupled to said AC to DC converter;
    first switch means interrupting said coupling between said AC source and said AC to DC converter when said moveable conductive prong is in said second position;

second switch means interrupting said coupling between said first electrical contact and said electrochemical energy storage cell and between said second electrical contact and said electrochemical energy storage cell when said conductive prong is in said first position.

7. A dual source rechargeable battery assembly in accordance with claim 6 wherein said moveable conductive prong further comprises an insulating shaft supported by a bearing surface such that said insulating shaft may rotate about its center axis and a conductive L-shaped member having two essentially perpendicular member elements and affixed to said insulating shaft at the junction of said two essentially perpendicular member elements.

8. A dual source rechargeable battery assembly in accordance with claim 7 wherein said first switch means further comprises a conductive spring contact which contacts one of said perpendicular member elements when said moveable conductive prong is in said second position.

9. A dual source ;rechargeable battery assembly in accordance with claim 7, wherein said second switch means further comprises at least two spring contacts each contacting one of said perpendicular member elements when said moveable conductive prong is in said first position.

10. A rechargeable battery assembly for a handheld radio, comprising:
   at least one electrochemical energy storage cell within a battery housing;
   first means, including a first connector disposed on said battery housing, for charging said storage cell from an external direct current (DC) source;
   second means, including a second connector which protrudes from said battery housing to accomplish connection to an alternating current (AC) source, for charging said storage cell from said (AC) source; and
   third means, responsive to use of said second connector, for preventing said AC source at said second means from presenting an electrical hazard at said first connector.

11. A rechargeable battery assembly in accordance with claim 10 wherein said second means further comprises means for retracting said second connector when said connection to an AC source is not needed.

12. A rechargeable battery assembly in accordance with claim 11 wherein said third means further comprises switch means for interrupting coupling to said DC source when said second connector protrudes from said battery housing.

13. A rechargeable battery assembly in accordance with claim 11 wherein said third means further comprises switch means for interrupting coupling to said AC source when said second connector is retracted.

14. A rechargeable battery assembly in accordance with claim 10 wherein said second connector further comprises a moveable conductive prong having retracted and extended positions, said retracted position placing said moveable conductive prong below said battery housing surface and said extended position placing said moveable conductive prong above said battery housing surface.

15. A rechargeable battery assembly for a handheld radio, comprising:
   at least one electrochemical energy storage cell within a battery housing;
   first means, including a first connector disposed on said battery housing, for coupling said storage cell to the handheld radio;
   second means, including a second connector which protrudes from said battery housing to accomplish connection to an alternating current (AC) source, for charging said storage cell from said (AC) source; and
   third means, responsive to use of said second connector, for preventing said AC source at said second means from presenting an electrical hazard at said first connector.

16. A rechargeable battery assembly in accordance with claim 15 wherein said second means further comprises means for retracting said second connector when said connection to an AC source is not needed.

17. A rechargeable battery assembly in accordance with claim 16 wherein said third means further comprises switch means for interrupting coupling to the handheld radio when said second connector protrudes from said battery housing.

18. A rechargeable battery assembly in accordance with claim 16 wherein said third means further comprises switch means for interrupting coupling to said AC source when said second connector is retracted.

19. A rechargeable battery assembly in accordance with claim 15 wherein said second connector further comprises a moveable conductive prong having retracted and extended positions, said retracted position placing said moveable conductive prong below said battery housing surface and said extended position placing said moveable conductive prong above said battery housing surface.

* * * * *